Feb. 18, 1964        V. W. BARBERA        3,121,377
BALL CAMERA

Filed Oct. 20, 1961        2 Sheets-Sheet 1

INVENTOR:
VITO W. BARBERA
BY

Feb. 18, 1964 V. W. BARBERA 3,121,377
BALL CAMERA
Filed Oct. 20, 1961 2 Sheets-Sheet 2

INVENTOR:
VITO W. BARBERA
BY Richard von K. Bruns
Atty.

United States Patent Office 3,121,377
Patented Feb. 18, 1964

3,121,377
BALL CAMERA
Vito W. Barbera, Roberts Hill Road, New Hartford, N.Y., assignor of fifty percent to George R. Biviano, Norwich, N.Y.
Filed Oct. 20, 1961, Ser. No. 146,493
1 Claim. (Cl. 95—12.5)

This invention relates to aerial photographic apparatus and more particularly to a ball camera which can be propelled into the air to automatically photograph a scene from above.

Aerial cameras usually have means for lifting or suspending the camera in the air such as a kite, balloon, parachute, or other air vehicle. Heretofore known means for actuating the camera shutter include trip lines extending to the ground, altimeters, or timers.

The ball camera of the present invention, however, is a camera contained in a small sphere which can be thrown or otherwise propelled upward into the air and which then falls back to earth or can be caught in the hands. When launched into the air, the sphere is given a rotary motion which, with some skill, may be controlled so that the shutter is automatically operated when the camera is directed downward at a point near the zenith of its course. The ball camera may be used for amusement or for making observations over hills or woods, as by a surveyor or by a soldier in combat.

The primary object of the present invention, accordingly, is to provide a camera which can be propelled into the air so as to automatically photograph a scene from above.

A further object is to provide a small, rugged camera enclosed in a shock absorbing sphere which, when rotatively propelled upward into the air, will automatically take a picture of the scene below when the rotation of the sphere slows and the camera is pointed downward.

A still further object is to provide mechanism associated with a camera which will automatically operate the shutter of the camera when the mechanism stops rotating and the camera is pointed downward.

Another object is to provide a camera with a film roll therein which can be propelled into the air so as to automatically photograph a scene from above and which will not photograph another scene until the film is advanced and the camera is again propelled into the air.

Other objects and advantages will become apparent from the following description taken in conjunction with the accompanying drawings, in which.

Figure 1:
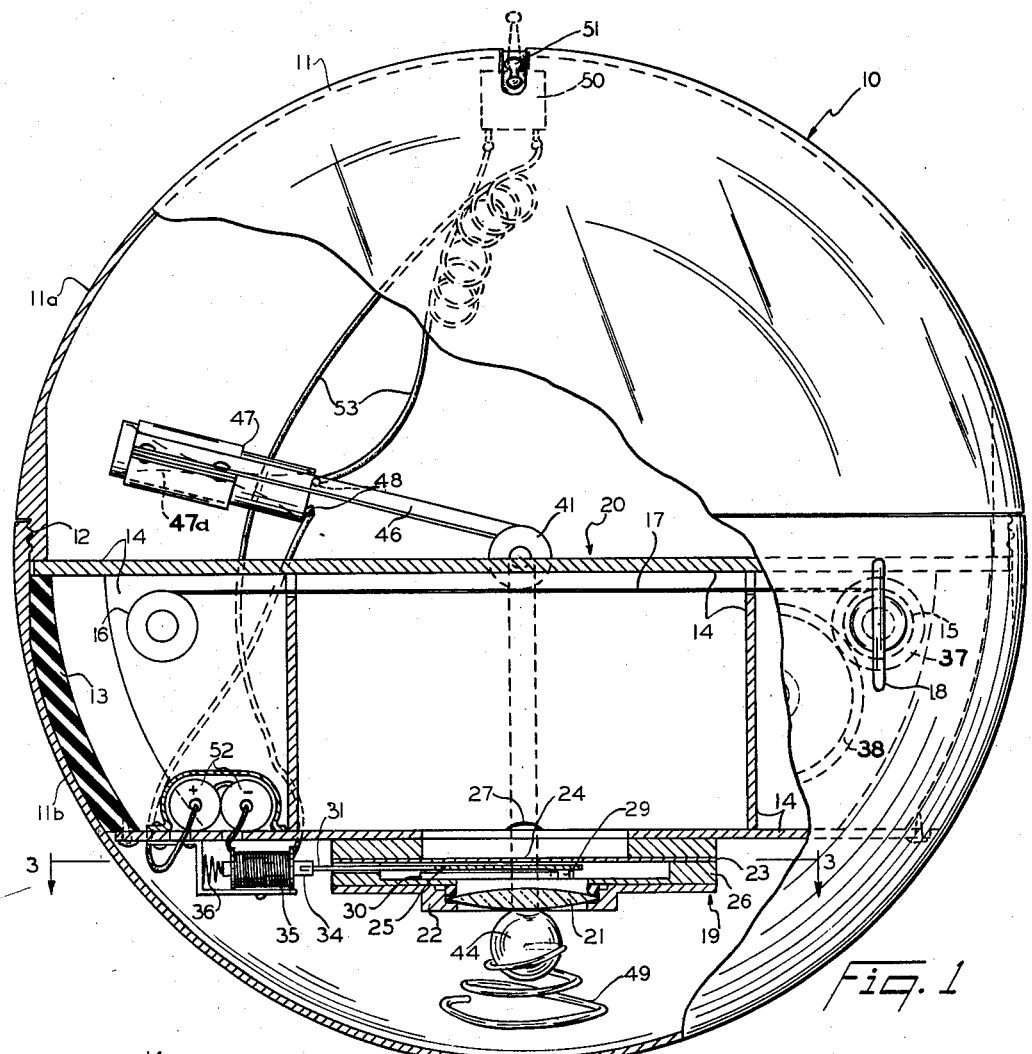
FIGURE 1 is a side elevational view, partly in section, of a ball camera according to the present invention.
Figure 2:
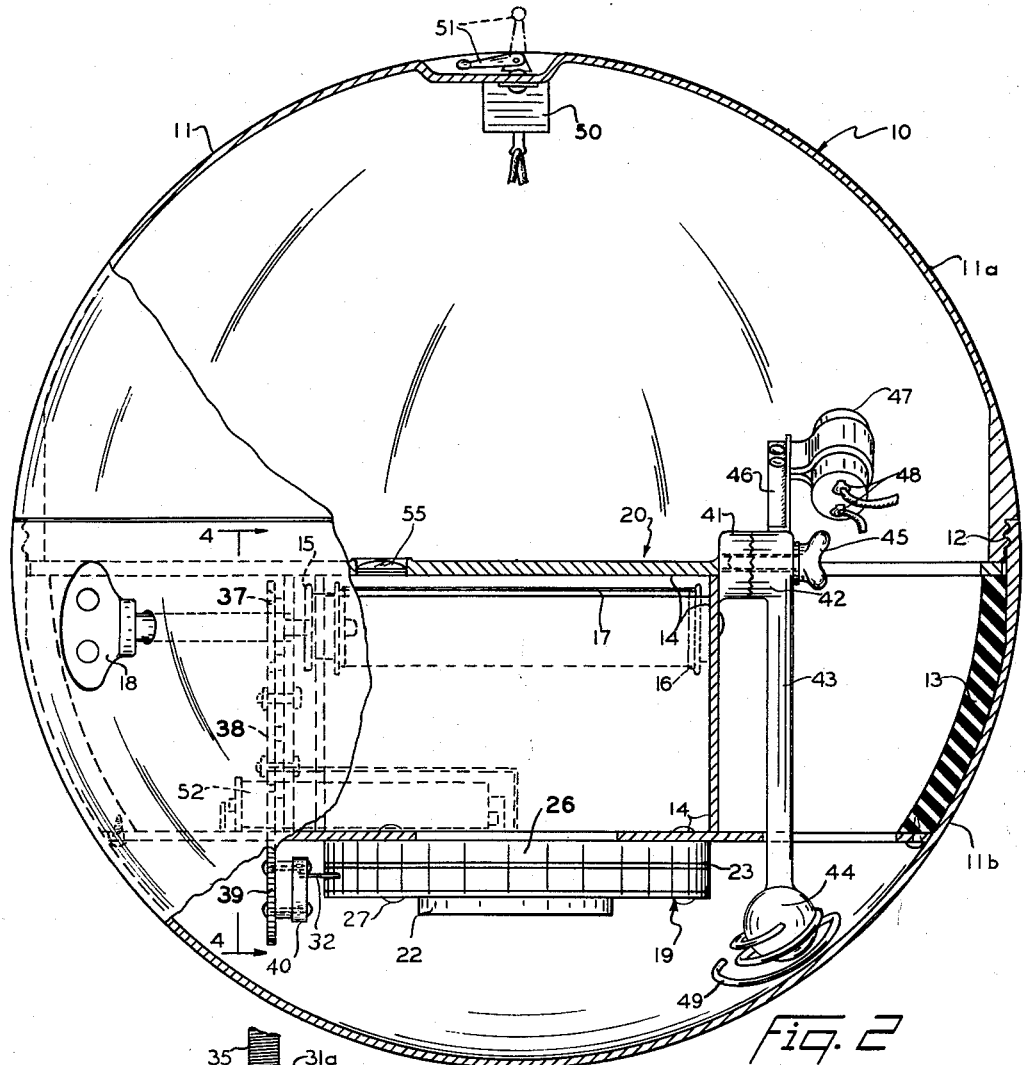
FIGURE 2 is a side elevational view thereof as viewed from the right in FIGURE 1, a portion of the surface covering thereof being broken away to show the interior.

Referring more particularly to FIGURES 1 and 2, the ball camera 10 has a covering comprising a hollow sphere 11 of transparent plastic material of two piece construction, two hollow hemispheres 11a and 11b being separably secured together at 12 in threaded engagement.

Within the sphere 11, and held in place by the two joined halves of the sphere, an annular camera frame 13 of rubber or other shock resisting material, supports a box or enclosure 14 containing spools 15 and 16 mounted in the usual manner for rolling the film 17 from the supply roll 16 to the winding roll 15. A key 18, insertable through a hole in the outer wall of the sphere 11, is provided for turning roll 15.

The box 14 is provided with a shutter and lens assembly 19 at its side opposite the film 17, at what may be hereinafter called the bottom of the sphere for purposes of reference, to complete the camera 20. Lens 21, supported as shown in assembly 19, is a wide angle lens, of the order of 150 degrees of angle, and is protected within a rim 22.

Above the lens an aperture plate 23 has a central aperture 24 which cooperates with the shutter 25 immediately below it in a manner to be described. Shutter 25 operates in a shutter chamber having sidewalls 26 and the whole assembly 19 is secured together by the rivets 27.

Figure 3:
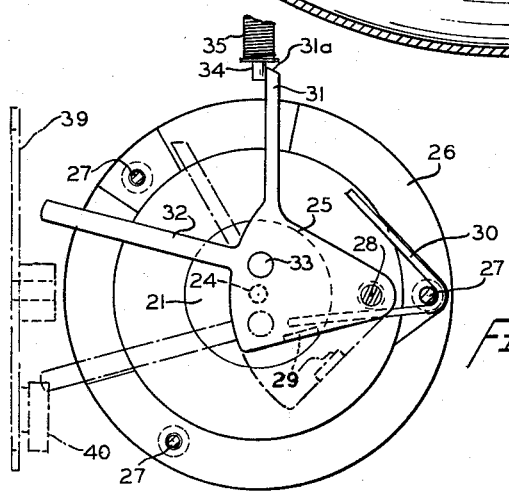
FIGURE 3 is a sectional view on the line 3—3 of FIGURE 1.

Any means for electromagnetically initiating the movement of, or operating, shutter 25 may be used, but a spring operated shutter is preferred. As shown in FIGURE 3, shutter 25 is pivotally secured at 28 to the aperture plate 23 and has a depending ear 29 engaged by a spring 30 to bias the shutter to one side. Shutter 25 is provided with a latch arm 31 and a loading or cocking arm 32, each projecting through cooperating slots in the sidewall 26. An aperture 33 in the shutter 25 is momentarily registerable with aperture 24 to expose film 17 as the shutter is swung by spring 30 from its latched or spring-loaded position shown in full lines in FIGURE 3 to its unlatched position, shown in broken lines.

The shutter latch arm 31 is engageable by the end of a core rod 34 of a small solenoid 35 secured to box 14 adjacent the assembly 19 as shown. For cocking, or spring loading the shutter, the end of arm 31 is beveled at 31a to cam the rod 34 back into the solenoid coil against the spring 36 (FIG. 1) which biases the solenoid 35 to its latching position.

Figure 4:
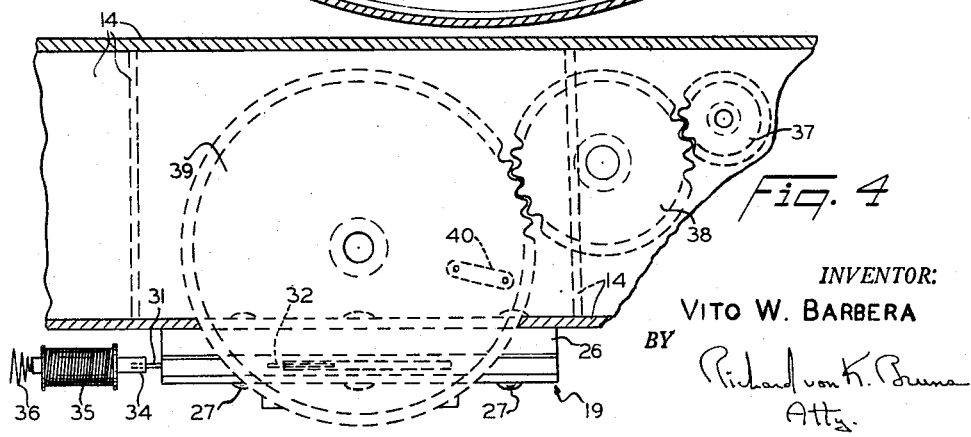
FIGURE 4 is a fragmentary sectional view on the line 4—4 of FIGURE 2.

Means for spring loading or cocking the shutter 25, when the film 17 is advanced from one picture frame to the next, is provided by a train of spur gears 37—38—39 shown in FIGURE 4. Gear 37 is connected to the winding spool 15 and is turned with the spool when wound by key 18. Gear 38, meshing with gears 37 and 39, is rotatably supported on the exterior of box 14. The gear 39, also supported on box 14, rotates adjacent the end of the cocking arm 32 when the gear train is operated, as indicated in FIGURES 2 and 3.

A cocking cam 40, secured on the side of gear 39 adjacent the shutter chamber sidewall 26, is engageable with the arm 32, as shown in FIGURE 2, when spool 15 is wound, so as to carry the arm 32 from its unlatched to its latched position as shown in FIGURE 3.

The side of the box 14 opposite the gear train carries an ear 41 having a serrated surface as shown in FIGURE 2. A mating lug 42, also serrated, on an arm 43 carrying a counterweight 44, is separably connected to the ear 41 by a wing bolt 45 so that the angular relation between box 14 and counterweight 44 may easily be changed upon opening the sphere 10.

The lug 42 also carries an arm 46 and on this arm is secured a mercury switch 47. The switch 47 has an hour-glass inner configuration, as shown by dash lines 47a in FIGURE 1, and is tilted with respect to the counterweight arm 43 so that the switch contacts 48 are at the lower end of the switch when arm 43 extends downward. A coil spring 49 is secured to counterweight 44 and extends to the inner wall of sphere 10 to act as a shock-absorber.

A safety switch 50 having an operating handle 51 in a recess in the exterior of sphere 10, as shown, is secured to the top of the sphere in any convenient manner, and batteries 52 are secured within the sphere, preferably to the box 14. Suitable wires 53 (FIGURE 1), of ample length to permit separation of the halves 11a and 11b, connect solenoid 35, switches 47 and 50, and batteries 52 in a circuit so that, when both switches are closed, the electromagnet or solenoid 35 is energized by current from the batteries 52 to withdraw the rod 34 from in front of latch 31 of the shutter.

It will be noted that most of the weight of the contents of sphere 10, including the camera 20 and counterweight 44 is off-center in the sphere, being all shown below the center of the sphere.

A window 55 may be provided at the top of box 14 for observing the usual frame numbers on the film 17 as key 18 is turned to advance the film from each frame to the next.

The operation of the ball camera will now be described. After the camera 20 has been loaded with film in the usual manner, the top cover of box 14 is replaced and locked into position by screwing together the two halves of the sphere. Switch handle 51 is left upright, switch 50 being open, and the key 18 turned until the first frame of the film is in position, as indicated in window 55.

As the key 18 is wound the cam lug 40 on gear 39 engages the cocking arm 32 of the shutter and the shutter 25 is swung to spring-loaded position. The key 18 is withdrawn, and the sphere is turned so that the mercury switch 47 has its contacts 48 pointed upward, the switch being visible through the transparent sphere 11.

The safety switch 50 is then closed, handle 51 being turned down into its recess. The ball camera is then thrown upwards and by allowing it to slide over the end of the fingers a rotary motion is given to the sphere and its contents.

While the sphere is rotating the mercury in the interior of switch 47 is kept away from the contact 48 by centrifugal force aided by the hourglass configuration of the switch interior, but when the rotation stops, or substantially so, the mercury flows centripetally of the sphere down the interior of the switch and makes an electrical connection between the contacts 48 completing the circuit to the solenoid 35. With a little practice anyone can learn to give the sphere the correct speed of rotation so that rotation will cease near the zenith of the thrown camera's flight upward. The weight of the contents of sphere 11 being off center, cessation of rotation takes place more rapidly than if the sphere were perfectly balanced and the weighted side of the sphere tends to turn downward.

The mercury of switch 47 can flow down to cover contacts 48 only when the switch is tilted with its contacts downward, and when this occurs the counterweight will also be directed downward because the switch is supported on the arm 46. As the ball rotates the counterweight leads the rotation, being in the heaviest portion of the sphere so that switch 47 is most likely to be in the position shown in FIGURE 1 when the switch contacts are connected. Since camera 20 is pointed or aimed in the same direction as the counterweight, it also will be pointed downward when the shutter operates.

When the circuit to solenoid 35 is completed, rod 34 is withdrawn into the solenoid and the shutter latch arm 31 is released allowing spring 30 to swing the aperture 33 past the aperture 24 to take the picture. Since lens 21 is a wide angle lens, the likelihood of a picture taken in the desired direction is excellent.

When the ball camera 10 falls to earth it is possible to catch it in the hand or in a net, but if this is not done the shock-absorbent features hereinabove noted prevent damage to the camera 20. After the camera is retrieved the safety switch 50 is again opened, key 18 is inserted to advance the film to the next frame, and shutter 25 is thereby again spring loaded for taking another picture.

Should it be desired that the picture be taken at an angle to the vertical the wing bolt 45 at one side of box 14 may be loosened and the angle between the counterweight arm 43 and the camera may be changed. The axis of lens 21 being directed downward as shown in FIGURE 1, it will be apparent that a change in the alignment of camera and arm 43 results in an angular change between camera and switch 47, resulting in a change in the probability of the direction in which the picture will be taken.

It will now be apparent that the ball camera 10 may be propelled upward by catapult or other means, as well as by being thrown, the only requisite being that a rotary motion be given the sphere upon launching it.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claim.

What is claimed is:

A ball camera which can be propelled rotatively upwards to photograph a scene from above, comprising: a transparent hollow body; and a camera, a source of electric current, a mercury switch, and an electro-magnetic motor secured within said body; said camera including a shutter for operating the camera and a lens; said switch, electro-magnetic motor and source of electric current being operably connected to operate said shutter; and said mercury switch having an hour-glass internal configuration and electrical contacts at one end, the axis of said mercury switch being radially disposed with respect to the center of said body, and the contact-bearing end of said switch being inclined with respect to the axis of said camera lens.

References Cited in the file of this patent

UNITED STATES PATENTS

| | | |
|---|---|---|
| 894,348 | Seele | July 28, 1908 |
| 935,760 | Johnson | Oct. 5, 1909 |
| 1,002,897 | Brown | Sept. 12, 1911 |